US010162316B2

(12) United States Patent
Pouw et al.

(10) Patent No.: US 10,162,316 B2
(45) Date of Patent: Dec. 25, 2018

(54) SYSTEM AND METHOD FOR PROVIDING AN ADAPTIVE USER INTERFACE ON AN ELECTRONIC APPLIANCE

(75) Inventors: Olav B. M. Pouw, Lochem (NL); Patrick H. Hayes, Mission Viejo, CA (US)

(73) Assignee: Universal Electronics Inc., Santa Ana, CA (US)

( * ) Notice: Subject to any disclaimer, the term of this patent is extended or adjusted under 35 U.S.C. 154(b) by 797 days.

(21) Appl. No.: 13/225,635

(22) Filed: Sep. 6, 2011

(65) Prior Publication Data

US 2012/0224101 A1 Sep. 6, 2012

Related U.S. Application Data

(60) Provisional application No. 61/380,860, filed on Sep. 8, 2010.

(51) Int. Cl.
| *G05B 15/02* | (2006.01) |
| *G05B 19/042* | (2006.01) |
| *H04N 5/44* | (2011.01) |
| *H04N 21/41* | (2011.01) |
| *H04N 21/422* | (2011.01) |

(52) U.S. Cl.
CPC ......... *G05B 15/02* (2013.01); *G05B 19/0426* (2013.01); *H04N 5/4403* (2013.01); *H04N 21/4126* (2013.01); *H04N 21/42204* (2013.01); *H04N 21/42222* (2013.01); *G05B 2219/23067* (2013.01); *G05B 2219/2615* (2013.01)

(58) Field of Classification Search
CPC ....... H04N 21/42204; H04N 21/42222; H04N 21/41264

See application file for complete search history.

(56) References Cited

U.S. PATENT DOCUMENTS

| 6,882,299 B1* | 4/2005 | Allport ........................ 341/176 |
| 7,136,709 B2 | 11/2006 | Arling et al. |
| 7,631,192 B1* | 12/2009 | Matsuo ................ H04N 5/4403 380/247 |
| 2003/0066075 A1* | 4/2003 | Bahn ................. H04N 5/44543 725/25 |
| 2003/0084456 A1* | 5/2003 | Ryan .................. H04N 5/44591 725/113 |
| 2006/0250578 A1 | 11/2006 | Pohl et al. |
| 2008/0000740 A1 | 1/2008 | Meyers et al. |
| 2008/0186411 A1* | 8/2008 | Kondo ................ H04N 5/4403 348/734 |
| 2009/0100474 A1 | 4/2009 | Migos |

(Continued)

OTHER PUBLICATIONS

International Bureau of WIPO, International Preliminary Report on Patentability of PCT Appln. No. US2011/50608, dated Mar. 21, 2013, 8 pages.

(Continued)

*Primary Examiner* — Samira Monshi
(74) *Attorney, Agent, or Firm* — Greenberg Traurig, LLP

(57) ABSTRACT

A controllable device, such as a set top box, responds to a transmission received from a one of a plurality of controlling devices of differing capabilities by entering into a one of a plurality of operating modes wherein the one of the plurality of operating modes entered into corresponds to the capabilities of the controlling device from which the transmission originated.

19 Claims, 9 Drawing Sheets

(56) References Cited

U.S. PATENT DOCUMENTS

| | | |
|---|---|---|
| 2009/0174524 A1 | 7/2009 | Chuey et al. |
| 2010/0052870 A1* | 3/2010 | King .................... G06F 13/385 |
| | | 340/286.02 |
| 2010/0085209 A1 | 4/2010 | Teuling et al. |

OTHER PUBLICATIONS

European Patent Office, extended European search report issued on EP patent application No. 11824037.3, dated Dec. 1, 2016, 8 pages.

* cited by examiner

SYSTEM AND METHOD FOR PROVIDING AN ADAPTIVE USER INTERFACE ON AN ELECTRONIC APPLIANCE

RELATED APPLICATION INFORMATION

This application claims the benefit of U.S. Provisional Application No. 61/380,860, filed Sep. 8, 2010. The disclosure within that application is incorporated herein by reference in its entirety.

BACKGROUND

Consumer electronic appliances such as set top boxes for receiving and decoding cable and satellite signals, televisions, DVD players, game systems, etc. are well known in the art, as are the hand held controlling devices, for example remote controls, which may be provided for use in issuing commands to these appliances. In some instances these controlling devices may be made available in various forms, for example coded to assist in recognition of individual users in a household; optimized for a specific function such as game playing, web browsing, or movie watching; or specially adapted to the needs of the elderly or of children. While such controlling devices may serve the purposes for which they were intended, in some instances it would be advantageous if the controlled appliance were further enabled to recognize the nature of the controlling device currently in use and adapt its appliance configuration, menuing system, GUI, etc. accordingly.

SUMMARY OF THE INVENTION

This invention relates generally to systems in which more than one controlling device may be available for the operation of an appliance or group of appliances, and in which different controlling devices may each be enabled to convey a specific identity to a controlled appliance to facilitate adaptation of appliance features and/or configuration in accordance with the controlling device currently in use. As appropriate for a particular embodiment, such a controlling device identity may take the form of a data field embedded within a conventional command transmission frame or may comprise a separate, discrete transmission. Additionally, according to the particular embodiment the controlling device identity may be communicated in conjunction with every command transmission; communicated only in conjunction with certain commands or keystrokes (for example menu initiation); communicated in conjunction with detected events such as a user picking up a controlling device; or a combination thereof.

In response to a received controlling device identity, a target appliance may adjust its GUI display, offer a different set of menu choices, reconfigure its mode of operation or functionality, etc. For example, as presented hereafter by way of illustrative embodiment, a set top box may be adapted to present different versions of an on-screen program guide GUI, each optimized to the population for which the controlling device currently in use is particularly intended, viz: Regular users, elderly users, or children.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
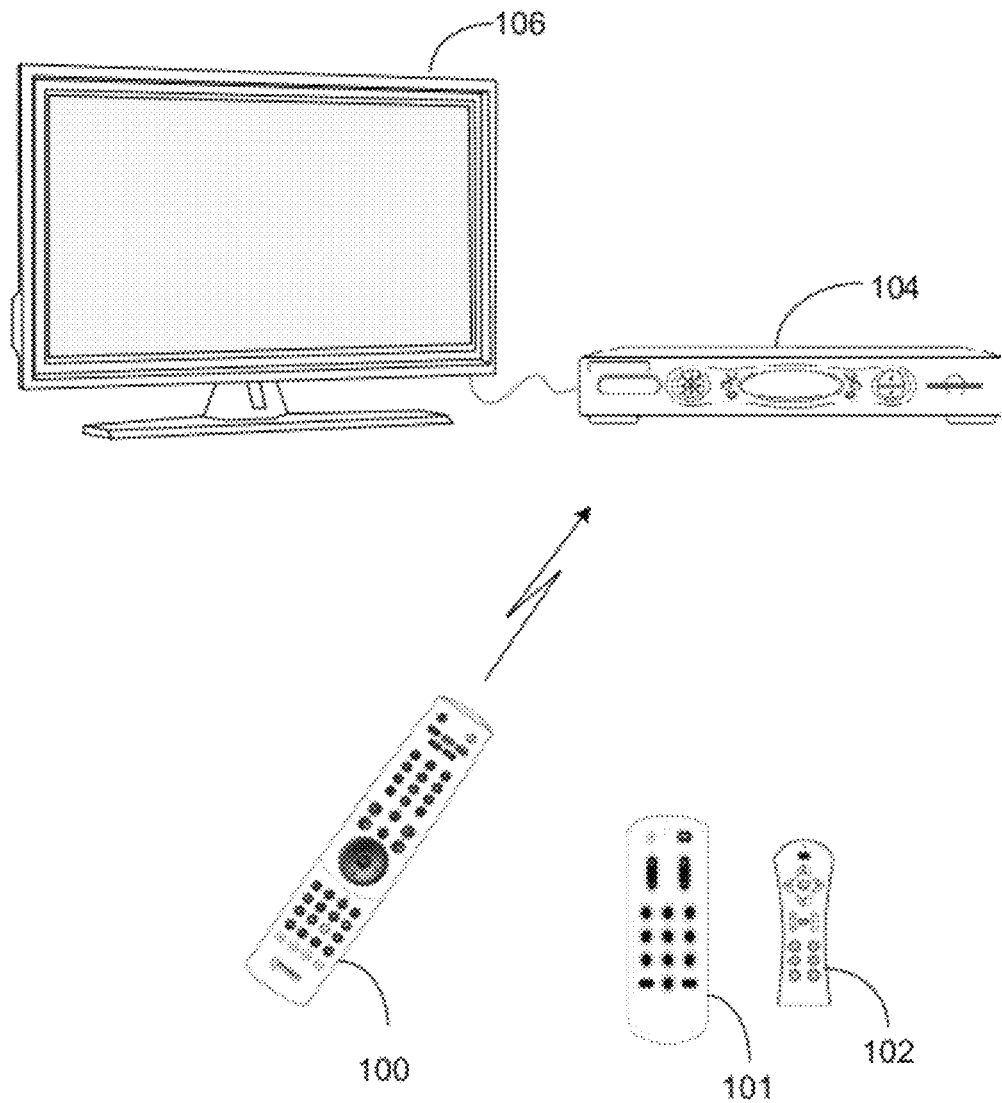
FIG. 1 illustrates an exemplary system in which multiple controlling devices and a set top box configured in accordance with the instant invention may be utilized.
Figure 2:
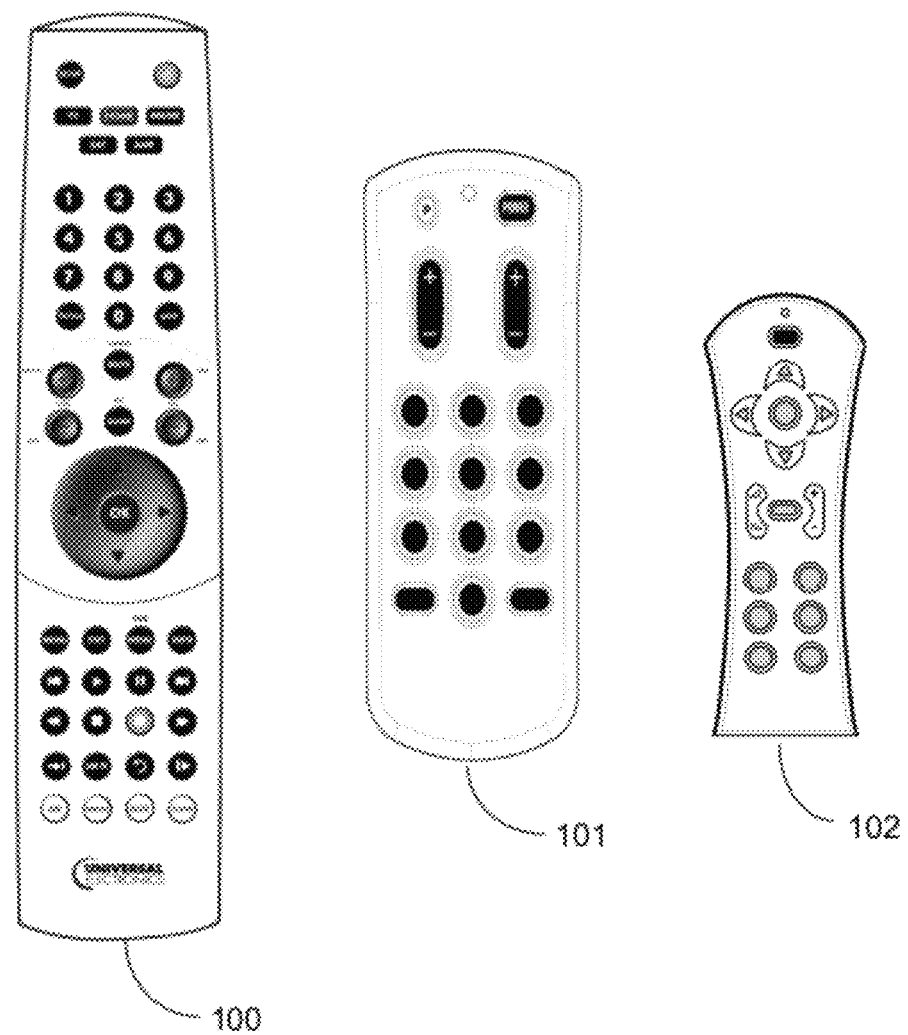
FIG. 2 further illustrates the exemplary controlling devices of the system of FIG. 1.

Turning now to FIG. 1, an exemplary system is illustrated wherein several controlling devices 100,101,102 may be provided for the purpose of commanding the operation of a digital set top box ("STB") 104. As is known in the art, controlling devices 100 through 102 may be capable of transmitting commands to the STB using any convenient IR, RF, Point-to-Point, or networked protocol, to cause the STB to perform operational functions. As is also known in the art, one or more of controlling devices 100 through 102 may comprise so-called "universal" functionality, that is be equipped with a library of command code sets suitable for controlling multiple appliances of different manufacture, for example to enable control of the sound volume of a TV set 106 being used to render the audio/video output stream originating from STB 104. With reference to FIG. 2, while all being capable of commanding the operation of STB 104, each of the controlling devices may be functionally, visually, and/or ergonomically optimized for a particular user population. For example, controlling device 100 may comprise a generic or standard controlling device, shipped with every unit of STB 104 and capable of controlling all available functions of the STB including set-up, configuration, etc., and intended for use by regular and/or technically adept users. In contrast, controlling device 101 may comprise fewer, larger buttons which function to control only the everyday functionality of STB 104, and may be intended to simplify access to STB-provided services by elderly subscribers. In some embodiments, controlling device 101 may also incorporate an emergency alert ("panic button") for summoning assistance, as contemplated for example in co-pending U.S. patent application Ser. No. 12/956,44. Controlling device 102 may comprise even fewer buttons packaged in a visually appealing and/or brightly colored housing which may be dimensionally adapted for smaller hands, and may be intended for use by children.

Figure 3:
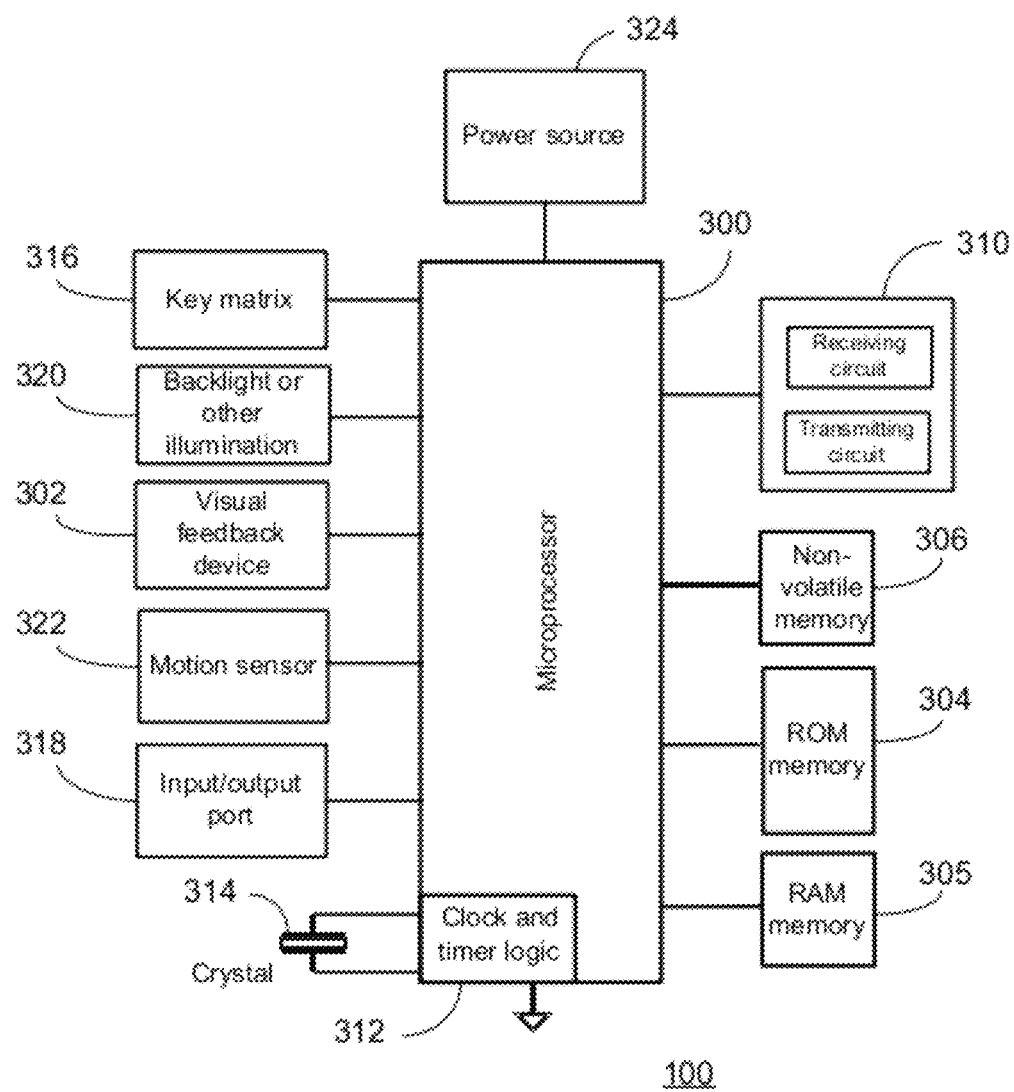
FIG. 3 illustrates a block diagram of exemplary components of an exemplary controlling device of FIG. 1.

Returning now to the illustrative embodiment of FIG. 1 with particular reference to FIG. 3, for use in commanding the functional operations of one or more appliances each exemplary controlling device 100 through 102 (hereafter exemplified by controlling device 100) may include a processor 300 coupled to a ROM memory 304, a RAM memory 305, a key matrix 316 (e.g., hard keys, soft keys such as a touch sensitive surface overlaid on a liquid crystal (LCD), transmission circuit(s) and/or transceiver circuit(s) 310 (e.g., IR and/or RF), clock and timer logic 312 with associated crystal or resonator 314, a power source 324 such as battery, and as required for a particular embodiment, a non-volatile read/write memory 306 such as Flash, battery backed up SRAM, etc., means 302 to provide feedback to the user (e.g., one or more LEDs, display, speaker, and/or the like), an input/output port 318 such as a serial interface, USB port, modem, Zigbee, WiFi, or Bluetooth transceiver, etc., means 320 for backlighting a LCD display or keypad, and means 322 to detect the device being touched or picked up by a user such as a tilt switch, accelerometer, touch sensor, proximity sensor, inclinometer, etc.

As will be understood by those skilled in the art, some or all of the memories 304, 305, 306 may include executable instructions (collectively, the controlling device program memory) that are intended to be executed by the processor 300 to control the operation of controlling device 100, as well as data which serves to define to the operational software the necessary control protocols and command values for use in transmitting command signals to controllable appliances (collectively, the command data). In this manner, the processor 300 may be programmed to control the various electronic components within the controlling device 100, e.g., to monitor the key matrix 316, to cause the transmission of signals, etc. The non-volatile read/write memory 306, for example an EEPROM, battery-backed up RAM, FLASH, Smart Card, memory stick, or the like, may additionally be provided to store setup data and parameters as necessary. While the memory 304 is illustrated and described as a ROM memory, memory 304 can also be comprised of any type of readable media, such as ROM, FLASH, EEPROM, or the like. Preferably, read/write memories 304 and 305 are non-volatile or battery-backed such that data is not required to be reloaded after battery changes. In addition, the memories 304, 305 and 306 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 304 and 306 respectively), and/or may be physically incorporated within the same IC chip as the microprocessor 300 (a so called "microcontroller") and, as such, they are shown separately in FIG. 3 only for the sake of clarity.

To cause the controlling device 100 to perform an action, the controlling device 100 may be adapted to be responsive to events, such as a sensed user interaction with the key matrix 316, detection of a triggering event via an appropriate trigger sensor, etc. In response to an event, appropriate instructions within the program memory (hereafter the "controlling device operating program") may be executed. For example, when a function key is actuated on controlling device 100, the controlling device 100 may retrieve from the command data stored in memory 304, 305, 306 a command value and control protocol corresponding to the actuated function key and, where necessary, current device mode, and transmit that command to an intended target appliance, e.g., TV 106 or STB 104, in a format recognizable by that appliance to thereby control one or more functional operations of that appliance. In accordance with the teachings of this invention, in some embodiments the transmitted command value may further incorporate a controlling device type identifier as described in greater detail hereafter. It will be appreciated that the operating program can be used not only to cause the transmission of commands and/or data to the appliances, but also to perform other operations. While not limiting, other operations that may be performed by the controlling device 100 may include displaying information/ data, favorite channel setup, macro key setup, function key relocation, etc. Examples of local operations may be found in U.S. Pat. Nos. 5,481,256, 5,959,751, and 6,014,092.

In certain embodiments, controlling device 100 may be universal, that is, adaptable to issue commands to a multiplicity of appliances of different type and/or manufacture. In such cases, for selecting a set of command data to be associated with an appliance to be controlled, data may be provided to the controlling device 100 that serves to identify an intended target appliance by its type and make (and sometimes model). Such data allows the controlling device 100 to identify the appropriate command data within a preprogrammed library of command data that is to be used to transmit recognizable commands in a format appropriate for such identified appliances. Since the operation and features of such universal controlling devices are well known in the art, for the sake of brevity these will not be discussed further herein.

Figure 4:
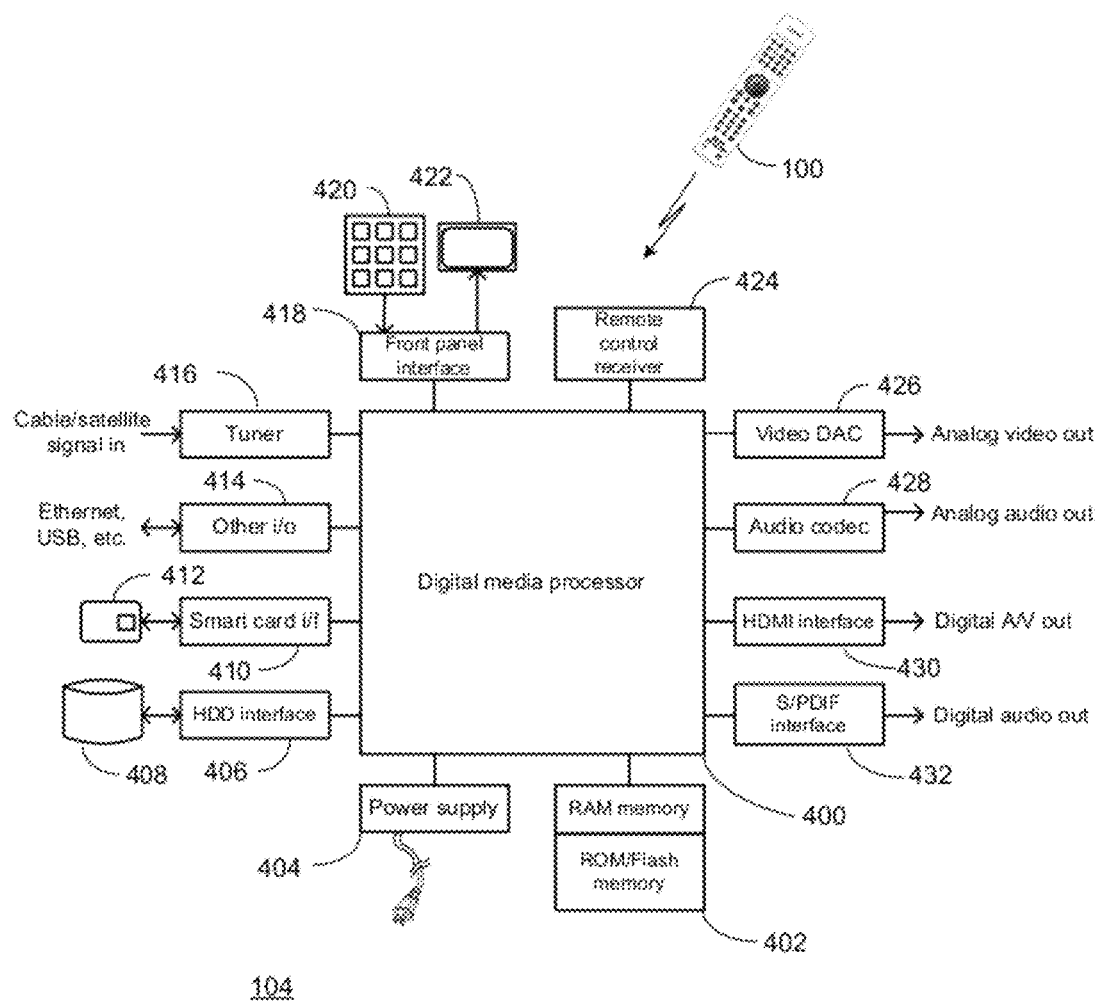
FIG. 4 illustrates a block diagram of exemplary components of the exemplary set top box of FIG. 1.

Turning now to FIG. 4, an exemplary STB 104 may include, as needed for a particular application, a processor 400 coupled to a memory 402 which may comprise RAM, ROM, and/or Flash memory; a power supply 404; a hard disk (HDD) interface 406 and associated disk drive 408, for example to support DVR functionality; a smart card and/or PCMIA interface 410 where required to accommodate service enablement/decryption cards 412; other input/output interfaces 414 such as USB, Ethernet, etc.; a front panel interface 418 with associated front panel keypad 420 and display means 422; a remote control receiver or transceiver 424 for reception of signal from a controlling device 100; analog video and audio outputs 426,428; digital audio/video and audio outputs 430,432; and one or more tuners 416 for receiving and demodulating a cable or satellite signal. As will be appreciated, in general tuner 416 may be capable of receiving both one or more digital media streams comprising program content and a so called out-of-band data stream comprising, for example, program guide information, software updates, etc.

As is known in the art, programming instructions may be stored in memory 402 which when executed by processor 400 may enable the STB appliance 104 to receive and decode digital media and data streams from tuner 416; to store received media content and data on HDD 408 or in memory 402; to output received (from tuner 416) or retrieved (from HDD 408) media content via one or more of the output ports 426 through 432; to monitor other I/O ports 414 for activity; to receive, decode, and act upon user commands received from controlling device 100 or input via front panel 420; to display program guide information, listings of stored content, or setup and configuration menus at user request and act upon any resulting user input; etc.

Controlling devices 100 through 102 may incorporate device identity data into their command transmissions to STB 104, for example without limitation as described in U.S. Pat. Nos. 7,266,701 or 7,167,913, both of common ownership. In summary, U.S. Pat. No. 7,266,701 describes a command transmission protocol wherein each data frame transmitted includes a 2-bit ID field, i.e. allowing for up to four separate controlling device identities; while U.S. Pat. No. 7,167,913 describes a command transmission protocol wherein each data frame transmitted includes a 5-bit TAG field, all or part of which may be utilized for controlling device identification, i.e. allowing for up to as many as 32 separate controlling device identities. For a more detailed description of the exact encoding schemes and frame formats used by these protocols, the interested reader may refer to the disclosures of those patents, both of which are incorporated herein by reference in their entirety.

Figure 5A:
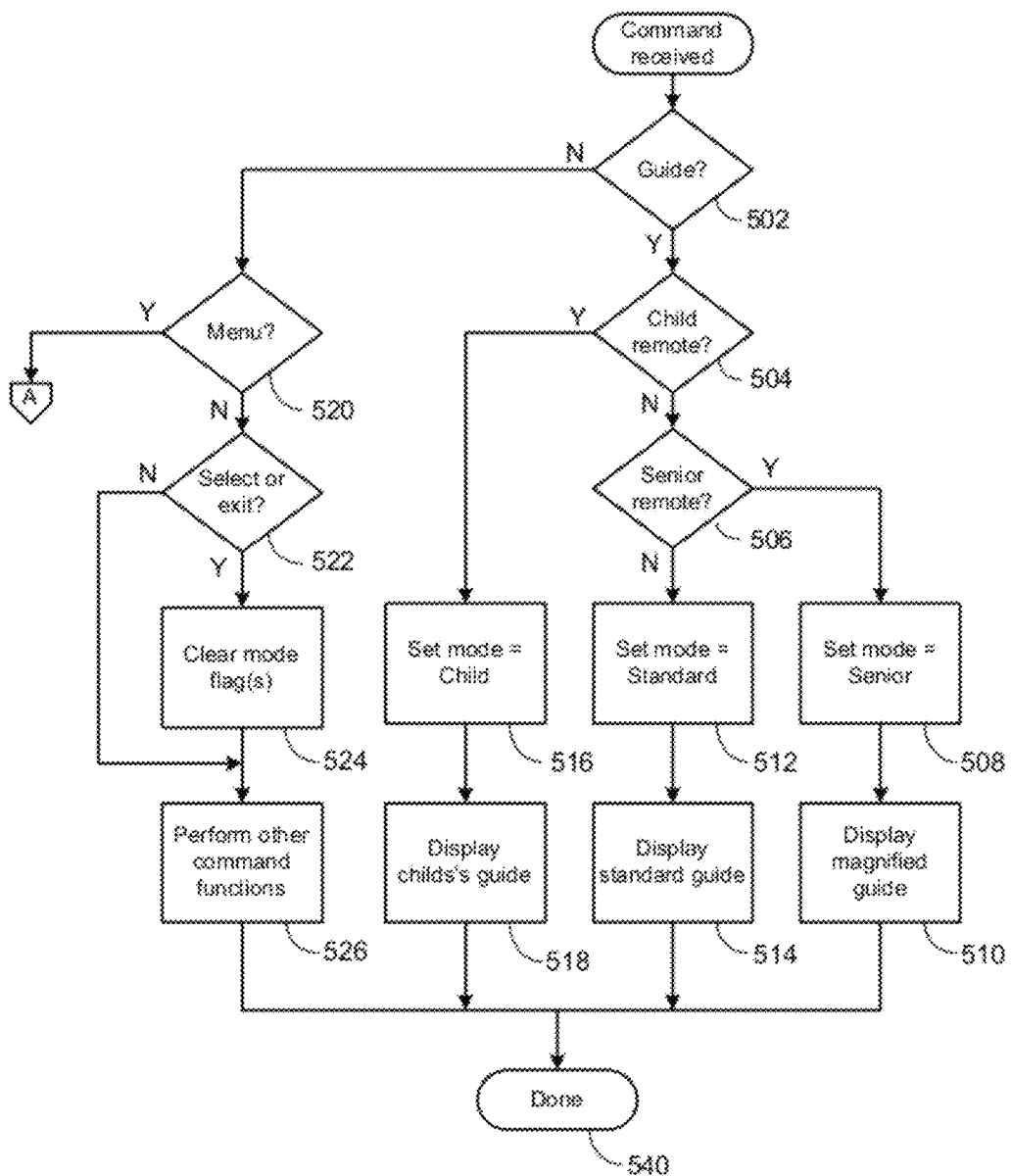
FIGS. 5a and 5b illustrate the steps of an exemplary method for adapting the operation of the set top box of FIG. 1 in accordance with the controlling device currently in use.
Figure 5B:
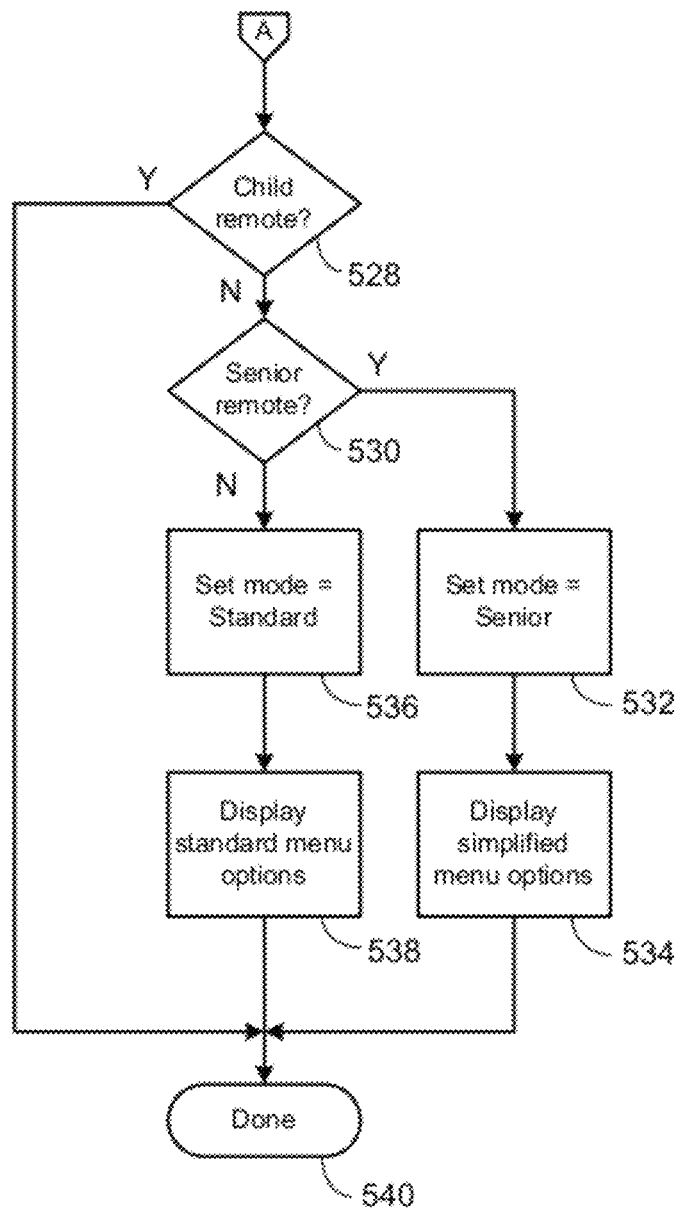

As is known in the art, programming instructions stored in the memory of an STB (hereafter, "STB programming") may be responsive to, inter alia, receipt of a "guide" command to invoke an interactive program guide or a "menu" command to enable STB configuration and adjustment. In accordance with the teachings of this invention, the STB programming stored in memory 402 of an exemplary STB 104 for use in the system of FIG. 1 may be further enabled to adapt program guide and/or configuration GUIs and capabilities based upon the identity of the controlling device which issued the command to initiate that operation, as will now be described in conjunction with FIGS. 5a and 5b.

Figure 8:
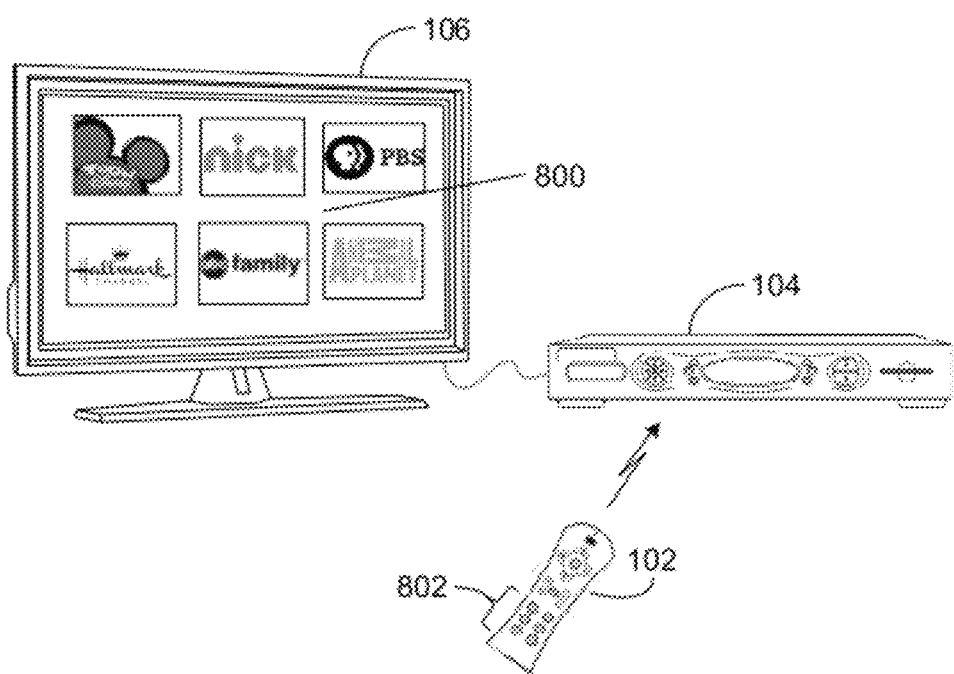
FIG. 8 illustrates the exemplary operation of the set top box of FIG. 1 when used in conjunction with a third exemplary controlling device.

Upon receipt of a command from a controlling device, for example via remote control receiver 424, a step 502 the STB programming may determine if the received command transmission constitutes a "guide" command. If so, at step 504 the STB programming may examine the controlling device identity information contained within that command transmission to determine if the transmission originated from children's remote 102. If so at step 516 the operating mode of STB 104 may be set to "child" and at step 518 a program guide display suitable for interaction with a child may be displayed. By way of example, as illustrated in FIG. 8 such a program guide may comprise a simplified GUI 800 featuring colorful channel logos each corresponding to a single one of a group of direct-access buttons 802 provisioned on controlling device 102. With reference to the operational mode setting of step 516, by way of further explanation, in the exemplary implantation the setting of an operating mode in response to receipt of a controlling device identity embedded in a command such as "guide" or "menu" may be required to enable interpretation of subsequently received commands, for example GUI navigation inputs, to be consistent with the currently displayed GUI and/or the capabilities and features of the controlling device presently in use. As will become evident, this operating mode may be reset upon exit from the currently displayed GUI. As will also be appreciated, in other embodiments such functionality may be achieved through different means, for example a controlling device equipped with an accelerometer, capacitive touch sensor, or other such hardware may initiate a specific identification transmission upon initially detecting that it has been picked up by a user.

If the received device identity is not that of a children's remote, at step 506 the STB programming may next determine if the controlling device identity information indicates that the command transmission originated from a senior remote 101. If so at step 512 the operating mode of STB 104 may be set to "senior" and at step 510 a program guide display adapted for use by senior citizens may be presented. By way of example, as illustrated in FIG. 7, such a guide display 700 may comprise a magnified or zoomed version of the standard guide 600 of FIG. 6, for greater legibility. Alternatively or in conjunction with zooming, in some embodiments the number of programming choices presented may also be reduced, for example limited to a preconfigured list of favorites.

Figure 6:
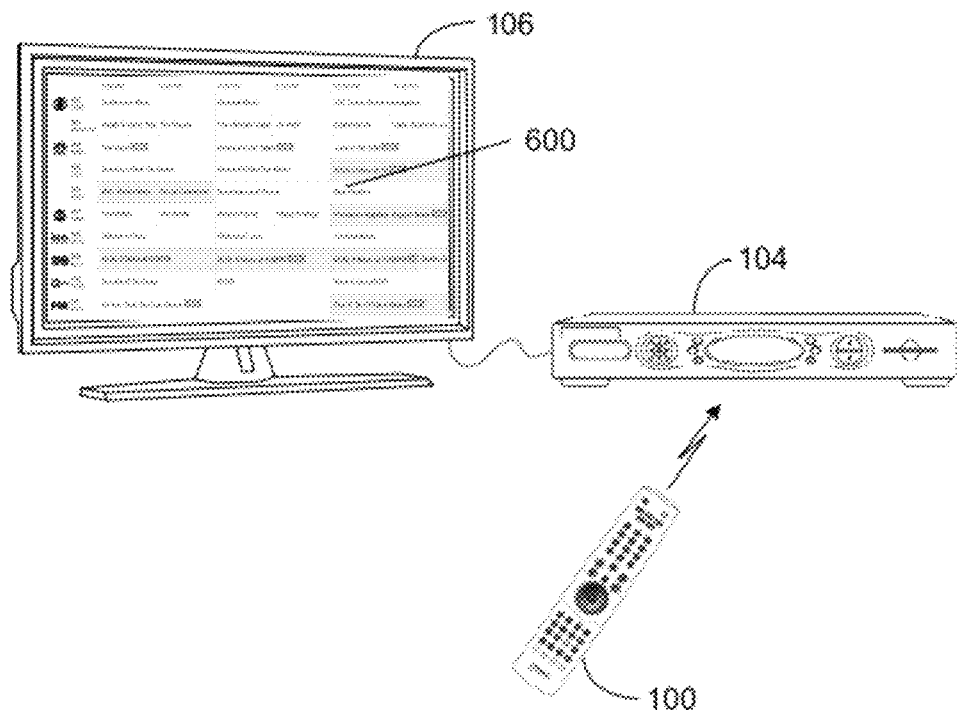
FIG. 6 illustrates the exemplary operation of the set top box of FIG. 1 when used in conjunction with a first exemplary controlling device.
Figure 7:
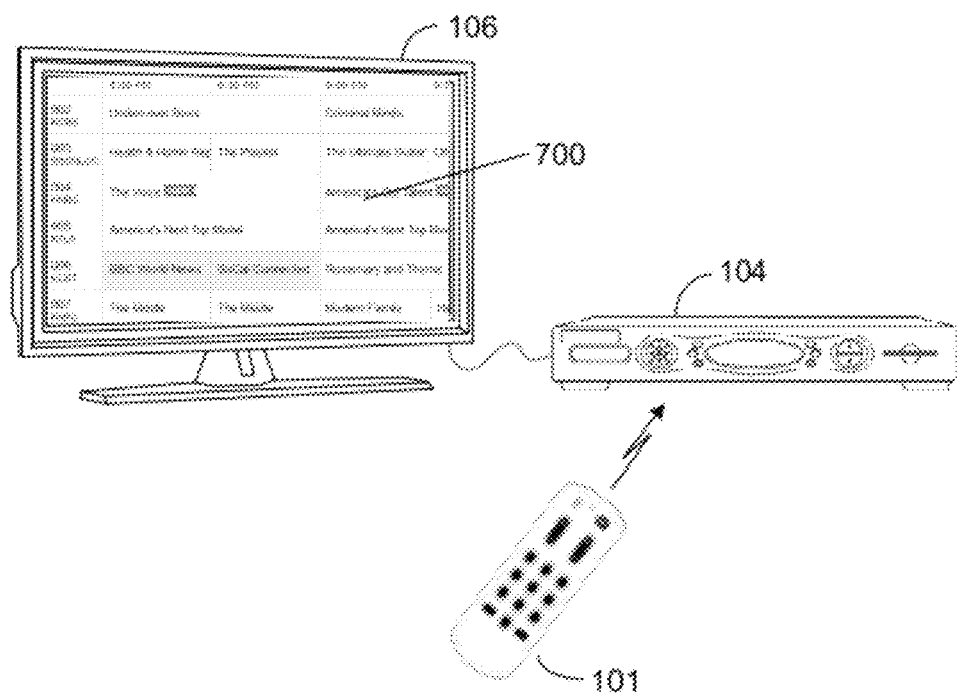
FIG. 7 illustrates the exemplary operation of the set top box of FIG. 1 when used in conjunction with a second exemplary controlling device.

If the received device identity is not that of a senior remote, the STB programming may then assume that the command transmission originated from a standard remote 100 (or, alternatively in some embodiments from an aftermarket universal remote control which does not support controlling device identity), set the operating mode of STB 104 to "standard" and present a default standard guide display, for example 600 as illustrated in FIG. 6.

Returning to step 502, if the STB programming determines that the received command transmission does not constitute a "guide" command, then at step 520 it is next determined if the received command transmission constitutes a "menu" command. If so, at step 528 (FIG. 5b) the STB programming may examine the controlling device identity information contained within that command transmission to determine if the transmission originated from children's remote 102. If so, the command is ignored and processing is completed at step 540. By way of explanation, in the illustrative embodiment children's remote 102 may not be permitted to initiate STB configuration adjustments. It will be appreciated that while in some embodiments this may be achieved by simply not provisioning child's controlling device 102 with a "Menu" key, in other cases this may not be possible, for example where a single physical controlling device design may be adapted for various user populations by means of setup programming, jumpers, identity plug-in modules, etc.

If the received device identity is not that of a children's remote, at step 530 the STB programming may next determine if the controlling device identity information indicates that the command transmission originated from a senior remote 101. If so, at step 532 the operating mode of STB 104 may be set to "senior" and a simplified STB configuration menu presented at step 534. Such a menu may comprise, for example, only basic settings necessary for day-to-day use of STB 104, and exclude adjustments which are chiefly required during initial setup or reconfiguration of STB 104.

If the received device identity is not that of a children's remote or a senior remote, then at step 530 the STB programming may set the STB operating mode to "standard" and at step 538 may display a complete menu of STB configuration options. By way of example, options presented may include configuration of the audio/video output of STB 104 to match TV 106, i.e. video resolution, picture aspect ratio, sound channels, etc.; setting of OSD timeouts and configurations for STB originated messages; selection of channel icons to be displayed while the STB is operating in "child" mode; etc. Returning to step 520 (FIG. 5a), if the received command is neither a "guide" nor a "menu" command, at step 522 the STB programming may next determine if the received command comprises a "select" or an "exit" command, i.e., a command which will result in the termination of an interactive menu or program guide GUI session. If so, at step 524 any currently set STB operating mode may be cleared prior to executing the received command at step 526.

Figure 9:
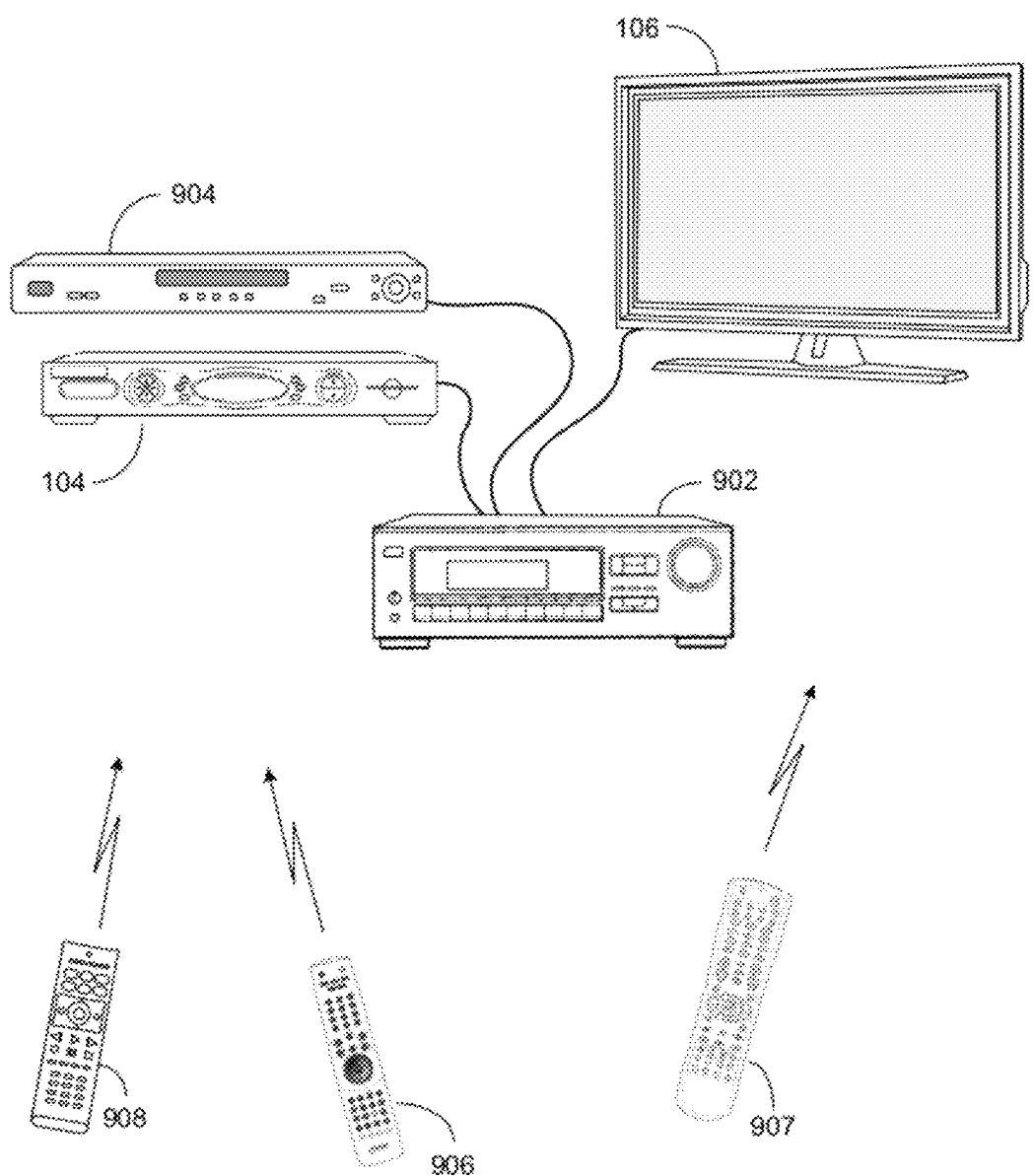
FIG. 9 illustrates a second exemplary system in which multiple controlling devices and an appliance configured in accordance with the instant invention may be utilized.

In a further exemplary embodiment as illustrated in FIG. 9, an appliance such as an AV receiver 902 which is connected to and capable of switching between multiple source and sink devices such as TV set 106, cable STB 104, or DVD player 904 may be adapted to detect which one of several controlling devices 906 through 908, each corresponding to one of devices 104, 106 or 904, is currently in use and may configure itself accordingly—for example selecting appropriate inputs and outputs, setting audio volume and equalization levels, etc. While such an arrangement may be particularly advantageous when all devices involved are of the same manufacture and share a standardized command protocol and transmission format in order to facilitate controlling device identification, it will be appreciated that other techniques are also possible, for example AV receiver 902 may be provided with a universal IR receiver capable of identifying and decoding the command transmission formats of a multiplicity of manufactures, such as described for example in U.S. Pat. No. 7,042,366, incorporated herein by reference in its entirety.

While various concepts have been described in detail, it will be appreciated by those skilled in the art that various modifications and alternatives to those concepts could be developed in light of the overall teachings of the disclosure. For example, in an alternate embodiment, a consumer electronic device or system which is capable of operating in more than one mode, such as a gaming console which may also function as a DVD player; an Internet enabled TV which supports not only regular television viewing but also Web browsing, email, or IP telephony; etc.; may be provisioned with multiple controlling devices each optimized for a particular function, and may adapt video or audio parameters, user menus, input and output ports or formats, etc. in accordance with the controlling device currently in the possession of a user, i.e. upon being used and/or upon being picked up.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A system, comprising:
a controllable device; and
a plurality of controlling devices each adapted to command one or more functional operations of the controllable device wherein each of the plurality of controlling devices is provided with a different input element set for providing input to the respective one of the plurality of controlling devices;
wherein the controllable device responds to a received transmission originating from a first one of the plurality of controlling devices having a command to control a functional operation of the controllable device and data indicative of its identity by automatically exiting from a first one of a plurality of controllable device operating modes and entering into a second one of a plurality of controllable device operating modes, wherein the second one of the plurality of controllable device operating modes automatically entered into by the controllable device corresponds to the input element set of the first one of the plurality of controlling devices from which the transmission originated, wherein the controllable device responds to a received transmission originating from a second one of the plurality of controlling devices having the command to control the functional operation of the controllable device and not having any data indicative of its identity by automatically exiting from the second one of the plurality of controllable device operating modes and entering into the first one of a plurality of controllable device operating modes, and wherein the first one of the plurality of controllable device operating modes automatically entered into by the controllable device is a default operating mode of the controllable device.

2. The system as recited in claim 1, wherein each of the first and second ones of the plurality of controllable device operating modes is associated with a respective one of a plurality of controllable device generated graphical user interface displays.

3. The system as recited in claim 1, wherein each of the first and second ones of the plurality of controllable device operating modes is associated with a respective one of a plurality of controllable device audio and/or video input and/or output configurations.

4. The system as recited in claim 1, wherein each of the first and second ones of the plurality of controllable device operating modes is associated with a respective one of a plurality of controllable device audio volume and/or equalization level settings.

5. The system as recited in claim 1, wherein the controllable device comprises a set top box.

6. The system as recited in claim 1, wherein the first one of the plurality of controlling devices is a children's version of a remote control.

7. The system as recited in claim 1, wherein the first one of the plurality of controlling devices is a senior's version of a remote control.

8. The system as recited in claim 1, wherein at least the first one of the plurality of controlling devices communicates with the controllable device via use of an infrared protocol.

9. The system as recited in claim 1, wherein at least the first one of the plurality of controlling devices communicates with the controllable device via use of a radio frequency protocol.

10. A method for effecting an operating mode of a controllable device via use of a plurality of controlling devices wherein each of the plurality of controlling devices is provided with a different input element set for providing input to the respective one of the plurality of controlling devices, the method comprising:
receiving at the controllable device from a first one of a plurality a controlling devices a first transmission, wherein the first transmission includes a command to control a functional operation of the controllable device and data indicative of an identity of the first one of the plurality of controlling devices;
using the command and the identity of the first one of the plurality controlling devices included in the first transmission at the controllable device to automatically exit from a first one of a plurality of controllable device operating modes and enter into a second one of a plurality of controllable device operating modes wherein the second one of the plurality of controllable device operating modes automatically entered into by the controllable device corresponds to the input element set of the first one of the plurality of controlling devices from which the transmission originated;

receiving at the controllable device from a second one of a plurality a controlling devices a second transmission, wherein the second transmission includes the command to control the functional operation of the controllable device and does not include any data indicative of an identity of the second one of the plurality of controlling devices; and using the command included in the second transmission and an absence of the identity of the second one of the plurality within in the second transmission at the controllable device to automatically exit from the second one of the controllable device operating modes and to automatically enter into the first one of a plurality of controllable device operating modes wherein the first one of the plurality of controllable device operating modes automatically entered into by the controllable device is a default operating mode of the controllable device.

11. The method as recited in claim 10, wherein each of the first and second ones of the plurality of controllable device operating modes is associated with a respective one of a plurality of controllable device generated graphical user interface displays.

12. The method as recited in claim 10, wherein each of the first and second one of the plurality of controllable device operating modes is associated with a respective one of a plurality of controllable device audio and/or video input and/or output configurations.

13. The method as recited in claim 10, wherein each of the first and second ones of the plurality of controllable device operating modes is associated with a respective one of a plurality of controllable device audio volume and/or equalization level settings.

14. The method as recited in claim 10, wherein the controllable device comprises a set top box.

15. The method as recited in claim 10, wherein the controllable device causes a display on a display device associated with the controllable device of a children's version of a graphical user interface in the first one of the plurality of operating modes in response to a transmission from the first one of the plurality of controlling devices wherein the first one of the plurality of controlling devices has input capabilities adapted for use by a child.

16. The method as recited in claim 10, wherein the controllable device causes a display on a display device associated with the controllable device of a senior's version of a graphical user interface in the first one of the plurality of operating modes in response to a transmission from the first one of the plurality of controlling devices, wherein the first one of the plurality of controlling devices has input capabilities adapted for use by a senior citizen.

17. The method as recited in claim 10, wherein each of the plurality of controlling devices communicates with the controllable device via use of an infrared protocol.

18. The method as recited in claim 10, wherein each of the plurality of controlling devices communicates with the controllable device via use of a radio frequency protocol.

19. The system as recited in claim 1, wherein the first one of the plurality of controllable device operating modes allows controlling device control of all remotely controllable functionalities provided by the controllable device and wherein the second one of the plurality of controllable device operating modes allows controlling device control of less than all remotely controllable functionalities provided by the controllable device.

* * * * *